United States Patent [19]
Kaneko et al.

[11] Patent Number: 5,341,458
[45] Date of Patent: Aug. 23, 1994

[54] METHOD OF AND SYSTEM FOR GENERATING TEACHING DATA FOR ROBOTS

[75] Inventors: Masakatsu Kaneko; Hidetaka Nosse; Katsumi Takeishi, all of Sayama, Japan

[73] Assignee: Honda Giken Kogyo Kabushiki Kaisha, Tokyo, Japan

[21] Appl. No.: 942,983

[22] Filed: Sep. 10, 1992

[30] Foreign Application Priority Data

Sep. 11, 1991 [JP] Japan .................. 3-232028
Sep. 12, 1991 [JP] Japan .................. 3-233260

[51] Int. Cl.$^5$ .................. G06F 15/46; G05B 17/00
[52] U.S. Cl. .................. 395/80; 395/90; 901/3; 318/568.13
[58] Field of Search .................. 395/80, 85, 88, 92, 395/99, 89; 901/3, 4, 5; 318/568.13

[56] References Cited

U.S. PATENT DOCUMENTS

| 4,347,578 | 8/1982 | Inaba | 395/85 |
| 4,590,578 | 5/1986 | Barto, Jr. et al. | 395/89 |
| 4,998,050 | 3/1991 | Nishiyama et al. | 395/99 |
| 5,006,999 | 4/1991 | Kuno et al. | 395/88 |
| 5,021,970 | 6/1991 | Mohri et al. | 395/99 |
| 5,053,976 | 10/1991 | Nose et al. | 395/86 |
| 5,136,223 | 8/1992 | Karakama et al. | 395/92 |
| 5,194,792 | 3/1993 | Hara | 395/99 |

FOREIGN PATENT DOCUMENTS 0309592 4/1988 European Pat. Off.
62-225382 9/1987 Japan.

Primary Examiner—Allen R. MacDonald
Assistant Examiner—Stuart Shapiro

[57] ABSTRACT

In a method and system for generating teaching data for robots, a plurality of virtual target points are disposed in the vicinity of each of target points allowable on design, where a tool center point of a robot is to be positioned. The virtual target points and the original target point are combined into "target points taken in a broad sense". Each of the target points taken in the broad sense is given as a point which has been confirmed as a tool-attainable point on an off-line teaching apparatus. When a necessary correction is made on-line to teaching data generated by the off-line teaching apparatus, including as data the target points taken in the broad sense, an operator can select a suitable point from the target points taken in the broad sense and carry out a process of correcting the teaching data, regarding the suitable point as being a starting point.

4 Claims, 13 Drawing Sheets

| TRIAL POINTS | ANGLE STEPS |
|---|---|
| No. 1 | −3° |
| No. 2 | −2° |
| No. 3 | −1° |
| No. 4 | −0° |
| No. 5 | +1° |
| No. 6 | +2° |
| No. 7 | +3° |

FIG.5

| TRIAL POINTS | ANGLE STEPS | DECISION OF ATTAINMENT | NUMBER OF ATTAINABLE SOLUTIONS | PRESENCE OF INTERFERENCE | OPTIMUM TRIAL POINT |
|---|---|---|---|---|---|
| No.1 | −3° | × | 0 | — | |
| No.2 | −2° | ○ | 1 | NO | |
| No.3 | −1° | × | 0 | — | |
| No.4 | 0° | ○ | 1 | YES | |
| No.5 | +1° | × | 0 | — | |
| No.6 | +2° | ○ | 1 | NO | |
| No.7 | +3° | ○ | 1 | NO | ○ |

FIG.8(a)
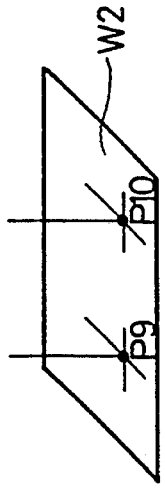
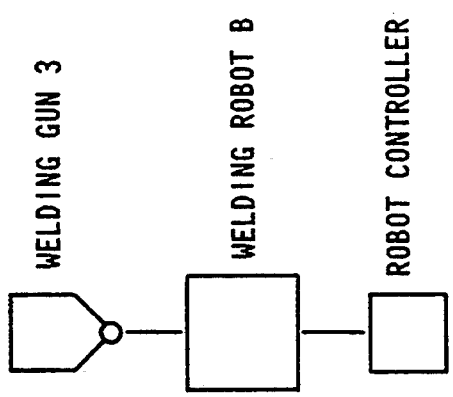
FIG.8(b)
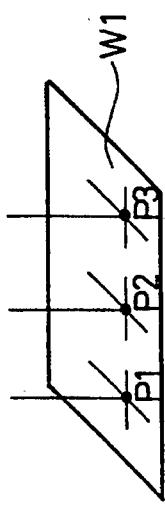
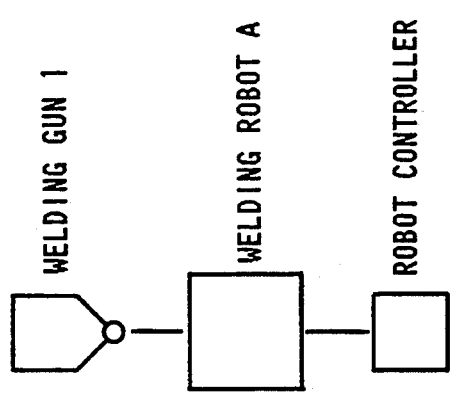

FIG.10(a)

| No. | TARGET POINT | TYPE OF ROBOT | TYPE OF ROBOT CONTROLLER | TYPE OF WELDING GUN | KIND OF WORK | MATERIAL OF WORK | WELDING CONDITON |
|---|---|---|---|---|---|---|---|
| 1 | P1 | A | 1 | 1 | 1 | 1 | 2 |
| 2 | P2 | A | 1 | 1 | 1 | 1 | 3 |
| 3 | P3 | A | 1 | 1 | 1 | 1 | 4 |
| ⋮ | | | | | | | |
| 9 | P9 | B | 2 | 3 | 2 | 2 | 5 |
| 10 | P10 | B | 2 | 3 | 2 | 2 | 6 |

FIG.10(b)

| No. | RESULT OF DETERMINATION |
|---|---|
| 1 | 3 |
| 2 | 2 |
| 3 | 1 |
| ⋮ | |
| 9 | 1200 |
| 10 | 1199 |

FIG.10(c)

| No. | CONTENTS OF DETERMINATION | | |
|---|---|---|---|
| | SHAPE OF REGION | LAYOUT | NUMBER OF POINTS |
| 1 | 1 | 2 | 4 |
| 2 | 1 | 1 | 4 |
| 3 | 1 | 1 | 4 |
| ⋮ | | | |
| 9 | 2 | 2 | 4 |
| 10 | 2 | 3 | 4 |

| RESULT OF DETERMINATION | TYPE OF ROBOT | TYPE OF ROBOT CONTROLLER | TYPE OF WELDING GUN | KIND OF WORK | MATERIAL OF WORK | WELDING CONDITION | CONTENTS OF DETERMINATION | | |
|---|---|---|---|---|---|---|---|---|---|
| | | | | | | | SHAPE OF REGION | LAYOUT | NUMBER OF POINTS |
| 1 | A | 1 | 1 | 1 | 1 | 4 | 1 | 1 | 4 |
| 2 | A | 1 | 1 | 1 | 1 | 3 | 1 | 1 | 4 |
| 3 | A | 1 | 1 | 1 | 1 | 2 | 1 | 2 | 4 |
| | | | | | | | | | |
| 1199 | B | 2 | 3 | 2 | 2 | 6 | 2 | 3 | 4 |
| 1200 | B | 2 | 3 | 2 | 2 | 5 | 2 | 2 | 4 |

METHOD OF AND SYSTEM FOR GENERATING TEACHING DATA FOR ROBOTS

BACKGROUND OF THE INVENTION

1. Field of the Invention

The present invention relates to a method of and a system for generating teaching data for industrial robots, and more specifically to a method of and a system for generating teaching data from an off-line teaching apparatus.

2. Description of the Related Art

In the industrial field, robots have been widely employed in processes such as welding, etc. Teaching data used to activate these robots are generated by an off-line teaching apparatus. Then, the teaching data are stored in a robot controller and on-line teaching for making necessary corrections to the teaching data is effected while the robots are actually being operated. After such a process has been completed, the teaching data are put to practical use.

In the off-line teaching apparatus, a robot and an object (work) or the like are displayed on the screen of a graphic display as three-dimensional images. The operation of the robot is simulated on the three-dimensional images together with target points where a tool center point of the robot is to be positioned, based on previously-input work environment data including data about the shapes of the robot, jigs, a work, peripheral devices, etc. and previously-input operating performance data including data about the number of shafts of arms of the robot, the lengths of the arm shafts and acceleration and deceleration capability of each arm shaft. If the tool center point of the robot can reach each of the target points during that simulation, then data about coordinates of the target points, data about the position and attitude of the tool and data about the attitude of the robot are employed as teaching data.

Further, the correction of teaching errors developed due to errors in dimensions of the jigs and the work or the like, accumulated errors developed when the tool successively travels along teaching points, etc., is carried out off-line. Thereafter, on-line teaching is effected, thereby confirming, on an actual-object basis, the presence of an obstruction in the course of movement of the tool center point to each of the target points and a tool unattainable distance or the like. If necessary, the teaching data are corrected so as to produce finally practicable teaching data.

However, when the teaching data are created using the conventional systems described herein, there is often a situation in which the tool cannot reach each of the target points on simulated images. In this case, it is necessary for an operator who operates the off-line teaching apparatus to change the data about the coordinates of the target points and the data about the attitude of the tool either singly or in combination based on the operator's experiences and repeat trial and error in order to search or find out the position in the vicinity of each of the target points allowable on design, to which the tool can attain. Therefore, a great deal of time and labor are required to obtain proper teaching data on the simulated images. It is also difficult to avoid dependence on a personal skill.

Even if the teaching data obtained off-line in this way are used, various errors such as dimensional errors developed for each robot, errors in arrangement of each robot, errors in dimensions of jigs and a work, etc. cannot be completely corrected, thereby causing problems such as interference among the robot, the jigs and work on a production line, interference among other robots, etc. Thus, a process for correcting the teaching data by trial and error made on the actual-object basis, i.e., the on-line teaching, cannot be omitted.

In the on-line teaching, the teaching data which involve problems such as interference, etc., are used to actually operate the robots. It is therefore necessary to operate the robots with great caution. There is also often a situation in which the degree of freedom in the trial and error is limited at the time of the trial operations of each robot on-line. Accordingly, even this on-line teaching develops a problem in that a lot of time and labor and the skill of an operator are required.

SUMMARY OF THE INVENTION

With the foregoing problems in view, it is a first object of the present invention to provide a method of and a system for producing teaching data for robots, wherein desired teaching data can be immediately and easily produced by standardizing the procedure of a trial-and-error on an off-line teaching apparatus.

It is a second object of the present invention to provide a method of and a system for generating teaching data for robots, wherein necessary corrected solutions can be securely and easily obtained by ensuring a predetermined degree of freedom for the trial and error effected on an actual-object basis when the produced teaching data are corrected on-line.

In order to achieve the first embodiment of the object, a first invention provides a method of generating teaching data for robots including a first step of setting a plurality of trial points in the vicinity of each of target points in attention where a tool center point of a robot is to be positioned; a second step of determining by computation, based on work environment data including data about the shape of any one of at least the robot, peripheral devices, jigs and a work and operating performance data including data about any one of at least the number of shafts of arms of the robot, the lengths of the arms and acceleration and deceleration performance, whether or not at least one attainable solution at the time that the tool center point is moved to the target point in attention and each of the trial points set in the first step is obtained; a third step of evaluating the results of computation relative to the target point in attention and each of the trial points by the second step in accordance with a predetermined evaluation standard and selecting one optimum point from the target point in attention and the trial points on the basis of the result of evaluation; and a fourth step of replacing the target point in attention with the optimum point, and providing a system for effecting the method referred to above.

In the first step according to the first embodiment of the invention, proposed or most suitable points regarded as objects for simulation to be effected on an off-line teaching apparatus can be selected in accordance with a standardized procedure for taking the proposed points as trial points which fall within an allowable range as seen from target points. In the fourth step, the optimum point used as an alternative to the initially-given target point is ensured as being a solution attainable at a high probability.

In order to achieve the second object, a second embodiment of the invention provides a method of generating teaching data for robots including a first step of setting a plurality of virtual target points in a first vicinity of each of target points where a tool center point of a robot is to be positioned and combining the target points and the plurality of virtual target points into target points taken in a broad sense; a second step of setting a plurality of trial points in a second vicinity of each of the target points taken in the broad sense in attention; a third step of determining by computation, based on work environment data including data about the shape of any one of at least the robot, peripheral devices, jigs and a work and operating performance data including data about any one of at least the number of shafts of arms of the robot, the lengths of the arms and acceleration and deceleration performance, whether or not at least one attainable solution at the time that the tool center point is moved to the target point taken in the broad sense in attention and each of the trial points set in the second step is obtained; a fourth step of evaluating the results of computation relative to the target point taken in the broad sense in attention and each of the trial points by the third step in accordance with a predetermined evaluation standard and selection one optimum point from the target point taken in the broad sense in attention and the trial points; and a fifth step of replacing the target point taken in the broad sense in attention with the optimum point and providing a system for effecting the method referred to above.

In the first step according to the second embodiment of the invention, a plurality of virtual target points are disposed around the initially-given target point in addition thereto. Further, each of the target points or the virtual target points can be replaced with the optimum point corresponding to a solution regarded as attainable at a high probability in the steps subsequent to the first step. This means that target points relative to teaching data are given as a set of tool-attainable points having a certain spread without treating the target points as being simply used as they are.

If any one of either target points or virtual target points indicated by the teaching data coincides with a point where the tool should be actually positioned, during the on-line trial, then an operator may erase data about either target points or virtual target points other than the coincident point. If any of either the target points or the virtual target points indicated by the teaching data does not coincide with the point referred to above, then the tool is moved from the present position to the point where the tool should be actually positioned. Afterwards, data about the moved point, i.e., a corrected new target point, is stored in a robot and other data are erased.

In the latter case, the operator can initiate such a target point correcting operation from the target points indicated by the teaching data. Further, if appropriate, the operator can visually select any one of the virtual target points which exist around the target points and are indicated by the teaching data, and can start the correcting operation from the selected virtual target point. This shows an important significance that the degree of freedom in the correcting operation under the on-line teaching can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The above and other objects, features and advantages of the present invention will become apparent from the following description and the appended claims, taken in conjunction with the accompanying drawings in which preferred embodiments of the present invention are shown by way of illustrative example only, and wherein:

FIG. 5 is a table illustrative of the result of simulation relative to the trial points shown in FIGS. 4(a) and 4(b);

FIGS. 6(a) through 6(d) are respectively views illustrative of various examples in which the maximum allowable range for setting trial points is established, in which:

FIG. 6(a) is a view showing a target point P on the surface of a work W, which is given by coordinates represented in the form of three axes comprising X-, Y- and Z-axes;

FIG. 6(b) is a view showing one example in which the maximum allowable range is set as a closed region represented in the form of a circle which defines a point P as the center and has a diameter of R;

FIG. 6(c) is a view depicting another example in which the maximum allowable range is set as a closed region given in the form of a rectangle formed by respective points of A, B, C and D on an X-Y plane; and FIG. 6(d) is a view showing a further example in which the maximum allowable range is set as a solid angle $\theta$ formed by changing the attitude of a tool about a Z-axis with respect to a point P;

FIGS. 7(a) through 7(c) are respectively views illustrative of other examples in which the maximum allowable range for setting trial points is established, in which;

FIG. 7(a) is a view showing one example in which the maximum allowable range is set as a closed region represented in the form of a sphere which defines a target point P as the center;

FIG. 7(b) is a view depicting another example in which the maximum allowable range is set as a closed region represented in the form of a cylinder which defines a point P as the center and has a diameter of R; and FIG. 7(c) is a view illustrating a further example in which the maximum allowable range is set as a closed region represented in the form of a semi-sphere which defines a point P as the center and has a diameter of R;

FIGS. 8(a) and 8(b) are views illustrative of a combination of generating conditions related to the generation of virtual target-point data;

FIGS. 10(a) through 10(c) are views for describing a process for generating virtual target-point data, in which;

FIG. 10(a) is a view showing a table descriptive of virtual target-point generating conditions;

FIG. 10(b) is a view showing a table descriptive of the result of determination; and FIG. 10(c) is a view showing a table descriptive of the contents of determination;

FIGS. 13(a) and 13(b) are views for describing the operation for effecting on-line teaching based on teaching data including as data the virtual target points shown in FIG. 12, in which;

FIG. 13(a) is a view showing one example in which no obstruction is developed upon movement of a tool; and FIG. 13(b) is a view showing another example in which there is an obstruction.

DETAILED DESCRIPTION OF THE PREFERRED EMBODIMENTS

A method of and a system for generating teaching data according to a first embodiment of the invention will hereinafter be described in detail with reference to the accompanying drawings in which preferred embodiments are shown by way of illustrative example.

Figure 1:
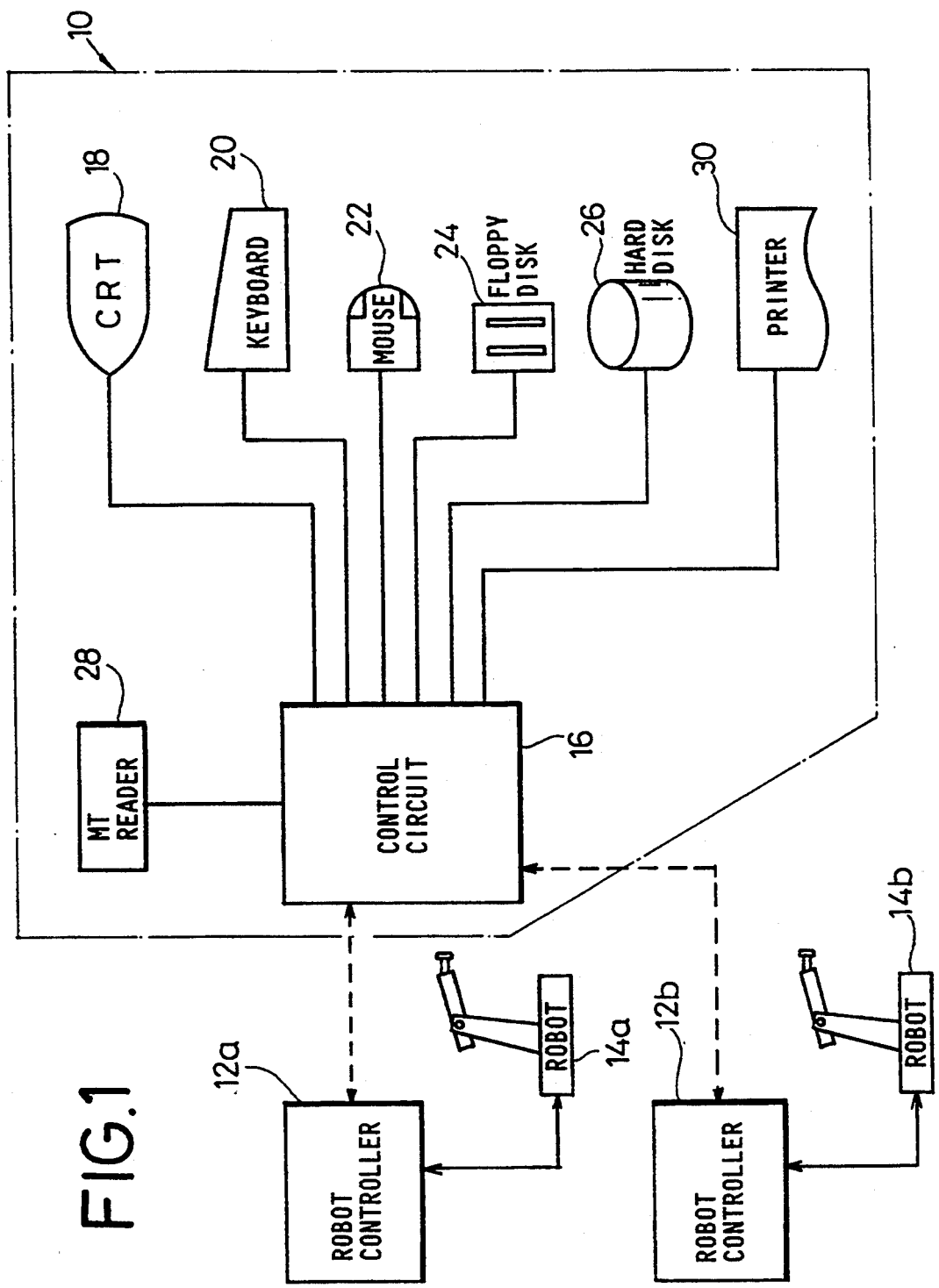
FIG. 1 is a block diagram showing the overall structure of a teaching data generating system according to the present invention.

In FIG. 1, an off-line teaching apparatus 10 comprises robot controllers 12a, 12b, which control welding robots 14a, 14b respectively.

Figure 2:
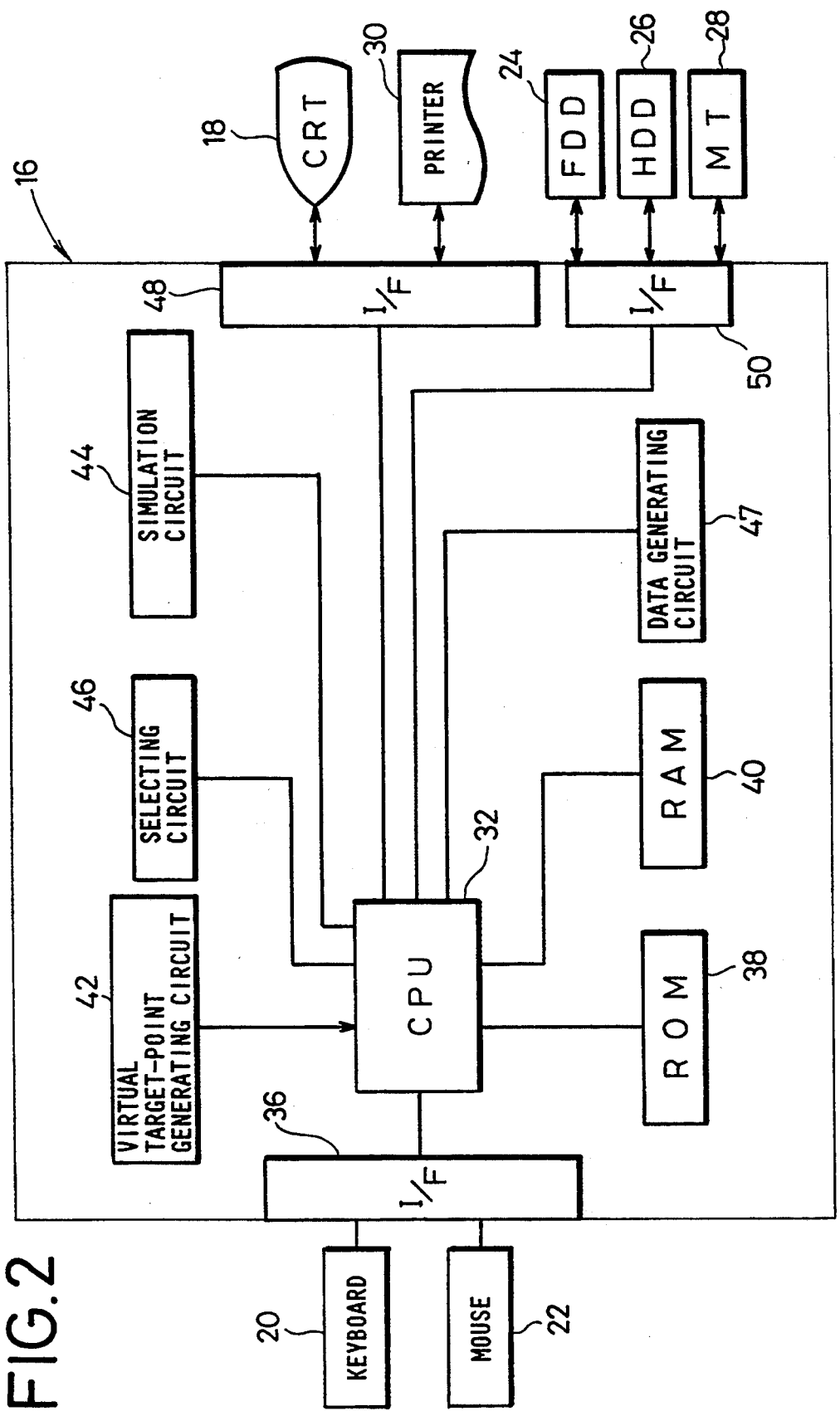
FIG. 2 is a block diagram showing the structure of a control circuit employed in the teaching data generating system shown in FIG. 1.

The off-line teaching apparatus 10 has a control circuit 16 to which a display device (CRT) 18, a keyboard 20, a mouse 22, a floppy disk driver (FDD) 24, a hard disk driver (HDD) 26, a magnetic tape (MT) reader 28 each serving as a storing means, and a printer 30 are respectively connected as external devices. As shown in FIG. 2, the control circuit 16 comprises a central processing unit (CPU) 32, a read only memory (ROM) 38, a read/write memory (RAM) 40 and interface circuits (I/F) 36, 48, 50.

Further, the control circuit 16 also includes a hypothetical or virtual target-point generating circuit 42, a simulation circuit 44 for effecting simulation for each target point or for every one of a plurality of trial points, a selecting circuit 46 for selecting the optimum trial point from the results of simulation by the simulation circuit 44, and a data generating circuit 47 for substituting the optimum trial point selected by the selecting circuit 46 for the initial target point to thereby generate teaching data. Incidentally, the virtual target-point generating circuit 42 will be described later.

The operation of the off-line teaching apparatus 10 constructed as described above will be described below using the following embodiments. The meaning of terms required to describe the embodiments below will first be explained below.

The term "target point" represents a working point where a tool center point of a robot is to be positioned, i.e., a point defined based on information about the design of a work W. The target point is specified by coordinate data about the target point and tool attitude data. When the teaching data are being produced by the off-line teaching apparatus, it is necessary to confirm whether or not a tool can reach a corresponding target point. If the answer is determined to be No, it is then necessary to find another target point to which the tool can attain, in the vicinity of target points allowable on design and to replace the initially-given target point with the found target point used as a new target point.

The term "trial point" represents a working point proposed for the "new target point" described in the above. The trial point is provided in plural form in the vicinity of the above target points allowable in view of design. During a period in which the teaching data are being generated by the off-line teaching apparatus, it is confirmed by computation whether or not the tool can reach the respective trial points. This computing process is called "simulation". As a result, the most suitable trial point is selected from the trial points which have been determined as attainable, in accordance with a given "criterion for evaluation". The most suitable trial point at this time will be regarded as a new target point. One example of the evaluation criterion will be described in the following embodiments. Incidentally, the target point referred to above is also treated as one of the trial points before the confirmation based on the simulation is carried out.

The term "maximum allowable range" represents the maximum distance range which is allowable on design as viewed from each target point. That is, the maximum allowable range is of a range at which the trial points are to exist. The maximum allowable range is known which is defined by distances on coordinates, tool angles and a combination of the two, for example.

The term "work environment data" include data indicative of the shape of a robot, the shape of a jig mounted to the robot, the shape of a work W and the shape of a peripheral device disposed around the robot, and the like, and are employed in the simulation.

The term "operating performance data" include, for example, data about the number of shafts of arms employed in a robot, data about the length of each of the arm shafts and acceleration-deceleration data at the time that the arm shafts are displaced, and similarly employed in the simulation.

Figure 3:
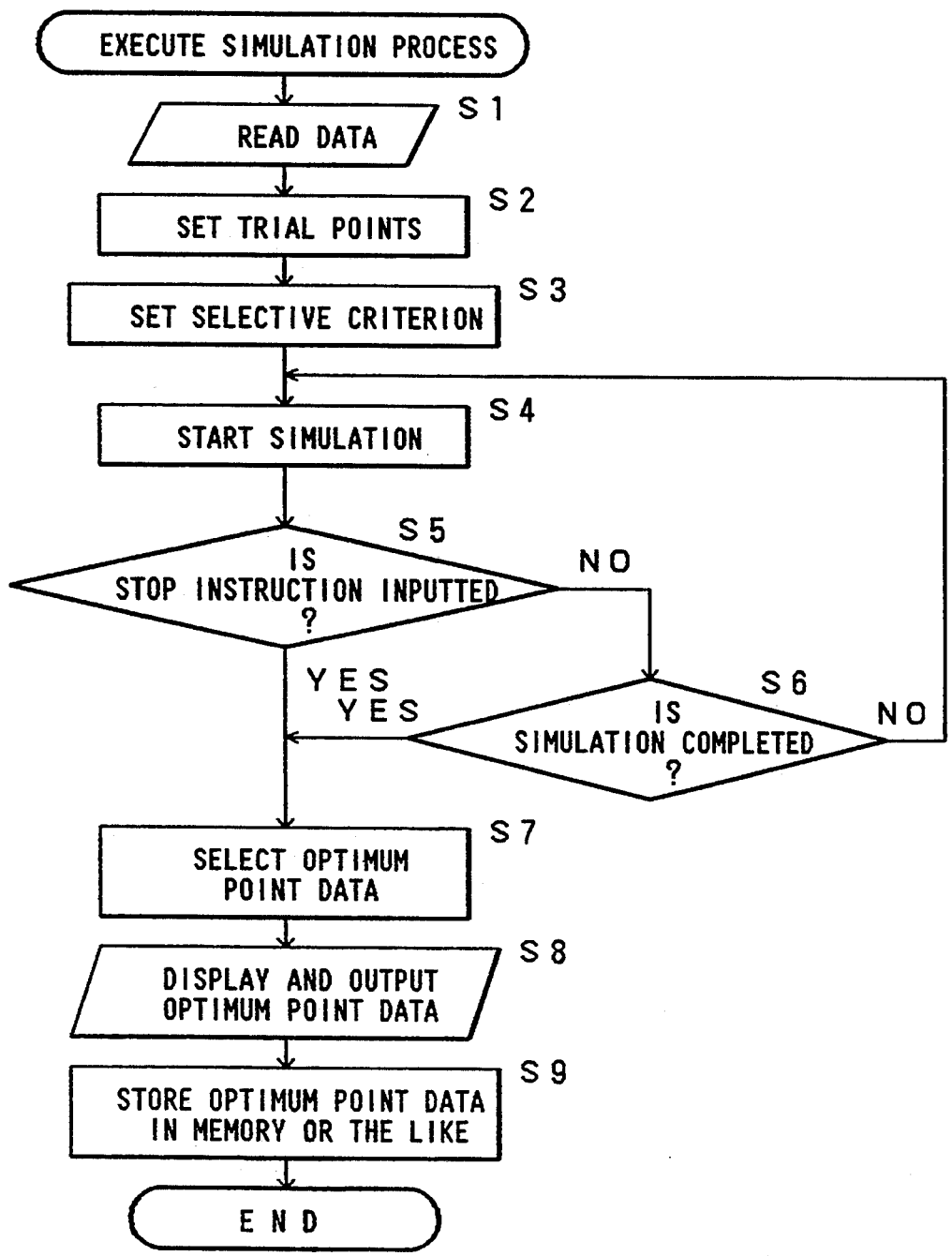
FIG. 3,is a flowchart for describing the operation for generating off-line teaching data by the teaching data generating system depicted in FIG. 1.

The embodiments will be described below. The target point data, the work environment data and the operating performance data of the robot have been previously stored in the hard disk 26. They are read from the hard disk 26 by RAM 40 as needed (Step S1 in FIG. 3).

Then, an operator sets trial points for every target points using the keyboard 20 (Step S2). That is, the kind of maximum allowable range, the value which falls within the maximum allowable range and a parameter for determining each trial point within the maximum allowable range are inputted for each target point and stored in the RAM 40 as data.

Figures 4A, 4B:
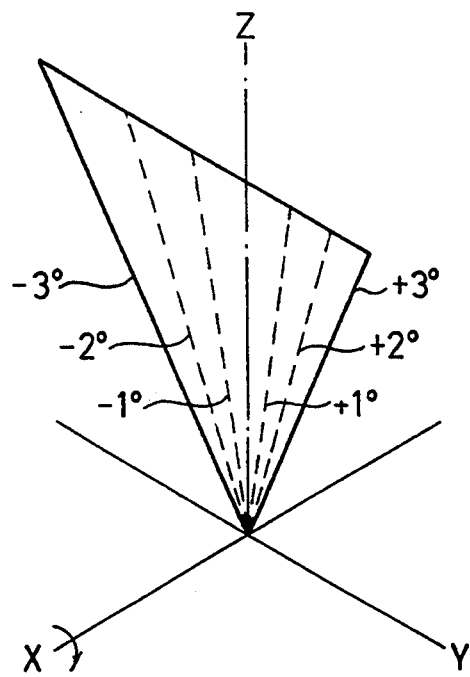
FIGS. 4(a) and 4(b) are a view illustrative of trial points and a table illustrative of numerical values for specifying the trial points, respectively.

In the present embodiment, the maximum allowable range is given as the maximum allowable value of an inclined angle of a tool with respect to the surface of the work W. For example, the maximum allowable value is ±3° as seen in the direction in which an X-axis is rotated about a Z-axis. The parameter for determining each trial point represents each of divided widths of the maximum allowable value, which is given as 1°, for example (see FIG. 4(b)). Thus, each trial point is given for each 1° as seen in the plus and minus directions about the Z-axis, with the result that seven trial points are set in total inclusive of the initially-given target point (see FIG. 4(a)).

Then, a criterion for selecting the optimum trial point from the results of simulation which is executed with respect to the respective trial points set in the above is inputted (Step S3) and stored in the RAM 40 as data. The selective criterion includes the following contents, for example, which are given a priority in order of the selective criterions shown below.

| | |
|---|---|
| Selective criterion 1: | tool reaches a work position corresponding to each trial point |
| Selective criterion 2: | interference in each trial point by other robot and a jig or the like is not developed |
| Selective criterion 3: | displacement of each trial point is minimized with respect to a working point serving as a standard |
| Selective criterion 4: | direction of displacement of each trial point has priority over plus side |

All the setting processes are completed in accordance with the respective steps described above and the simulation is started (Step S4).

The simulation is effected for each target point, i.e., for each trial point set in Step S2. When the tool center point is shifted to a corresponding trial point, it is determined by computation, on referring to the work environment data and the operating performance data, whether or not the tool can reach the target point and whether or not an obstruction to the movement of the tool center point to the corresponding trial point (i.e., interference in its movement) has occurred.

When a simulation stop command or instruction is inputted during the simulation (Step S5) or when the simulation relative to all the set trial points has been completed (Step S6), the results of simulation with respect to the respective trial points are evaluated in accordance with the optimum-point selective criterion set in Step S3, thereby selecting the most suitable trial point (Step S7).

When the result of simulation shown in FIG. 5 by way of example is obtained in Step S4, the selecting circuit 46 is activated to remove unattainable trial points Nos. 1, 3 and 5 based on the selective criterion 1 and to eliminate, based on the selective criterion 2, a trial point No. 4 at which interference is developed. Further, a trial point No. 7 is eliminated based on the selective criterion 3 because a displacement (+3°) of the trial point No. 7 is greater than displacements (±2°) of trial points Nos. 2 and 6.

Then, the direction of displacement of the trial point No. 2 falls under a minus region and the direction of displacement of the trial point No. 6 assumes a plus region. Therefore, the trial point No. 2 is removed based on the selective criterion 4. As a result, the trial point No. 6 is selected as the optimum point and used as a new target point (Step S7).

The new target point thus selected is displayed on the CRT 18 and outputted to the printer 30 (Step S8). Further, the target point is stored in the FDD 24 or the like as data (Step S9).

Then, the data generating circuit 47 computes attitude data of a robot, for realizing the new target point No. 6 on the basis of data about the new target point No. 6 to thereby produce teaching data.

Other examples for setting trial points will now be described with reference to FIGS. 6 and 7.

Figure 6A:
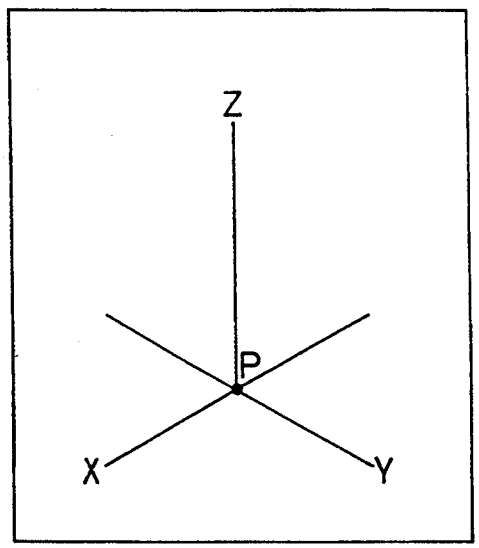
Figure 6B:
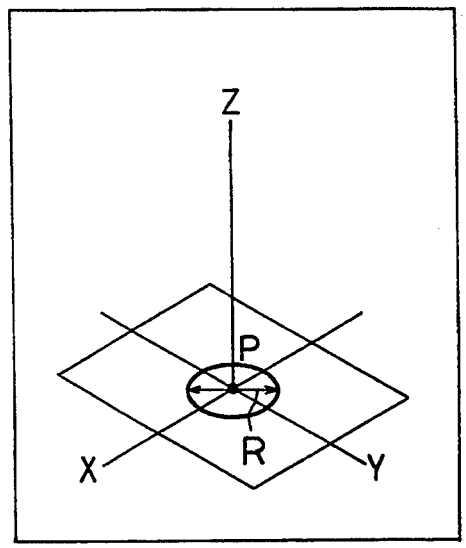
Figure 6C:
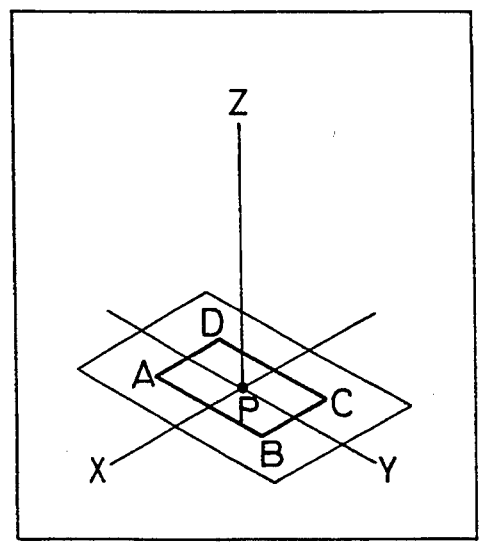
Figure 6D:
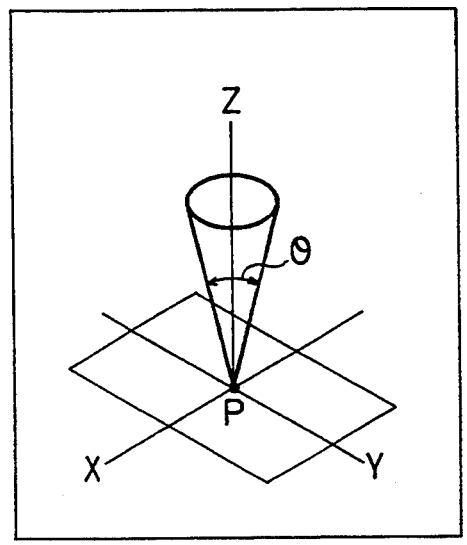

When the maximum allowable range is set as the distance on an X-Y plane from coordinate data of a working position serving as a standard on the surface of a work W, i.e., a target point, e.g., from a point P (see FIG. 6(a)) given by XYZ coordinates, i.e., three-axis coordinates, a Z-axis is specified as a fixed axis and a diameter of R is set. Thus, a closed region represented in the form of a circle formed on the surface of the work W, the circle defining a point P as the center and having a diameter of R, can be given as the maximum allowable range (see FIG. 6(b)).

Similarly, when the maximum allowable range is set as the distance on an X-Y plane, a Z-axis is specified as a fixed axis and coordinates defined by four points comprised of A, B, C and D are specified by an X-axis and a Y-axis. Consequently, a closed region surrounded by the four points can be obtained as the maximum allowable range (see FIG. 6(c)).

Further, when the maximum allowable range relative to the position or attitude of a tool is set about a target point P, an axis serving as a standard, e.g., a Z-axis is specified, so that the maximum allowable range of a solid angle .PT6/h. PT1/ can be set as the attitude of the tool brought into contact with the surface of the work W (see FIG. 6(d)).

Figure 7A:
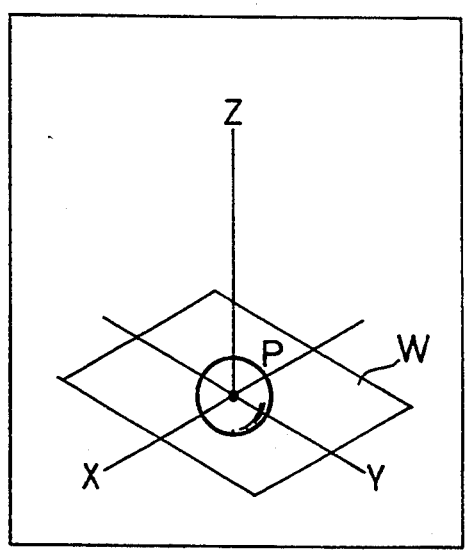
Figure 7B:
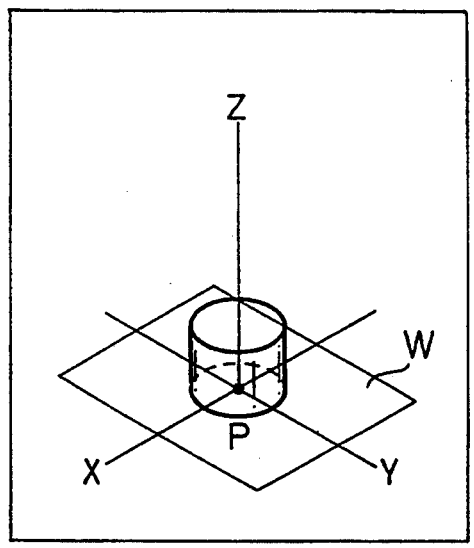
Figure 7C:
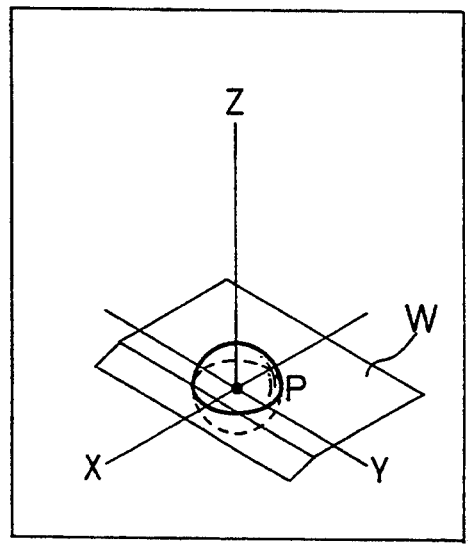

Furthermore, the maximum allowable range, which has a desired configuration and is solid, can be set to a target point P on the surface of a work W by combining the above-described respective setting methods or by using logical operations or the like as shown in FIGS. 7(a), 7(b) and 7(c).

According to the present embodiment, as has been described above, when parameters for determining the maximum allowable range and each trial point are inputted from the keyboard 20, a plurality of trial points are determined, and simulated for each trial point. Consequently, the most suitable trial point is selected from the result of simulation by the selecting circuit 46. Then, the data generating circuit 47 computes data about the attitude of a robot based on data about the optimum trial point, thereby making it possible to produce teaching data.

Since the off-line teaching data have heretofore been judged and created by the operator who observes the simulation on the display, oversights or the like have been developed. It is, however, possible to prevent these human errors from occurring, improve the reliability of the resultant teaching data and efficiently carry out a teaching data generating process.

Now, a second embodiment of the present invention will hereinafter be described in detail with reference to FIGS. 1 and 2 and FIGS. 8 through 13.

An off-line teaching apparatus 10 employed in the present embodiment is shown in FIG. 1 and identical to that employed in the first embodiment. However, the present embodiment differs from the first embodiment in that the virtual target-point generating circuit 42, which is disposed in the control circuit (see FIG. 2) 16 of the off-line teaching apparatus 10 and is not used in the first embodiment, is activated.

The operation of the off-line teaching apparatus 10 employed in the present embodiment will be described below laying stress on the operation of the virtual target-point generating circuit 42. The meaning of terms used to describe the present embodiment will first be explained below.

The term "virtual target points" represent temporary working points provided in plural form in the vicinity of respective target points allowable on design. The virtual target points and the original target point are combined together to form "target points taken in a broad sense". Each of the target points interpreted in the broad sense is given as a point which has been confirmed as a tool-attainable point in the off-line teaching apparatus by using the method of and the system for generating the teaching data according to the first embodiment.

The target points interpreted in the broad sense take on the following meaning. That is, the target points taken in the broad sense are given as a set of working points having a certain spread without treating the target points as being simply used as they are. When a necessary correction is made to the teaching data generated from the off-line teaching apparatus on-line in such a manner that a tool is placed on each of proper working points on an actual robot and an actual work, the target points given as the target points having a spread and taken in the broad sense are chosen in preference to the target points given as being simply used as they are as in the conventional example because the degree of freedom of operation can be improved, so that an on-line teaching process can be facilitated. At a stage in which the on-line teaching process has been completed, the target points taken in the broad sense are erased and hence only the proper working points on the actual robot and work are decided as points which have been finally taught.

The meaning of the above-described "target points" and "trial points" or the like which will be used below, is identical to the meaning of those employed in the first embodiment.

A description will now be made of a case in which virtual target points are made to target points P1, P2, P3 defined in a work W1 and target points P9, P10 defined in a work W2 as shown in FIG. 8.

In this case, the symbol indicative of the kind of welding gun for welding the work W1 is represented as "1". Further, the symbol indicative of the type of welding robot is represented as "A" and the symbol indicative of the type of robot controller is represented as "1". Similarly, the symbol indicative of the kind of welding gun for welding the work W2 is represented as "3". Further, the symbol indicative of the type of welding robot is shown as "B" and the symbol indicative of the type of robot controller is denoted as "2".

Figure 9:
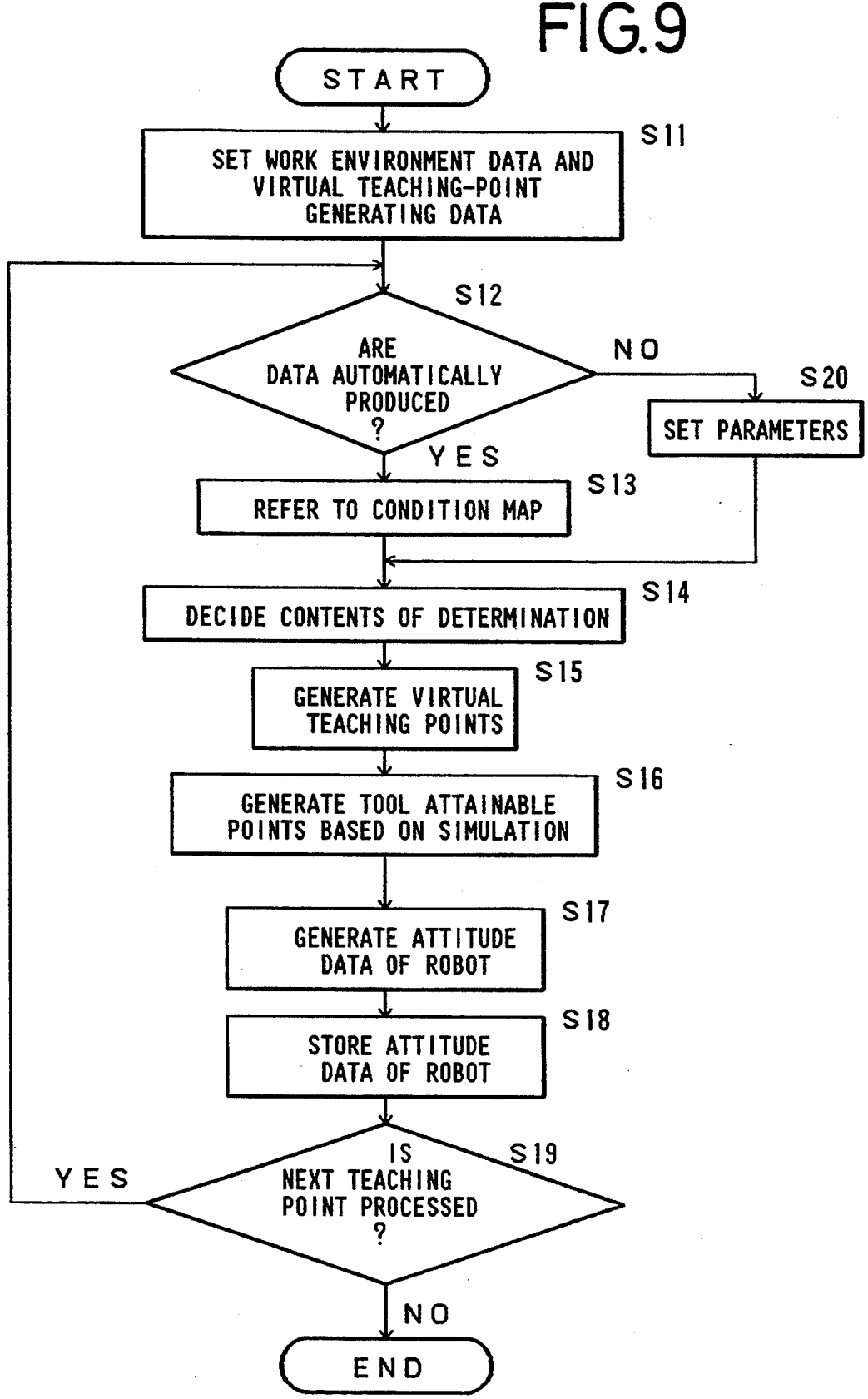
FIG. 9 is a flowchart for describing the operation for generating virtual target-point data.

When an instruction for reading data about the target point P1 is inputted from the keyboard 20 of the off-line teaching apparatus 10, the control circuit 16 is activated to read target point data from the hard disk 26 and read virtual target-point generating data (see FIG. 10(a)) comprised of information indicative of the type A of welding robot, information indicative of the type 1 of robot controller, information indicative of the kind 1 of welding gun, etc. therefrom (Step S11 of FIG. 9).

In this case, a look-up table (LUT) having the virtual target-point generating data stored therein comprises information indicative of the types A and B of welding robots, which corresponds to information indicative of the target points P1 through P10, information indicative of the types 1 and 2 of robot controllers, information indicative of the kinds 1 through 3 of welding guns, information indicative of the kinds 1 and 2 of works which are classified by thickness or the like, information indicative of the kinds 1 and 2 of materials such as iron and aluminum or the like, and information indicative of welding conditions 2 through 6 such as resistance welding time and a welding current value or the like as illustrated in FIG. 10(a).

Then, the control circuit 16 makes a decision as to whether or not an instruction inputted from the keyboard 20 states that virtual target-point data are automatically created (Step S12). If the answer is determined to be Yes, the result of decision or determination 3 is read from a condition map (see FIG. 11) on referring to the condition map (Step S13) on the basis of parameters for generating the virtual target points relative to the target point P1 stored as data in the hard disk 26 in advance, e.g., the type A of welding robot, the type 1 of robot controller, the kind 1 of welding gun, the kind 1 of work, the quality 1 of the work and the welding condition 2 (see FIG. 10(b)). The contents relative to the result of determination 3 are read based on the result of determination 3 on referring to the condition map again (see FIG. 11)(Step S14).

If it is determined in Step S12 that the instruction states manual creation of the virtual target-point data, then an operator inputs parameters for generating the virtual target points through the keyboard 20 (Step S20). In Step S14, the contents of determination are decided by reference to the condition map based on the manually-input parameters.

Figure 11:
FIG. 11 is a view showing a condition map referred to during a process of generation of the virtual target-point data shown in FIG. 10.
Figure 12:
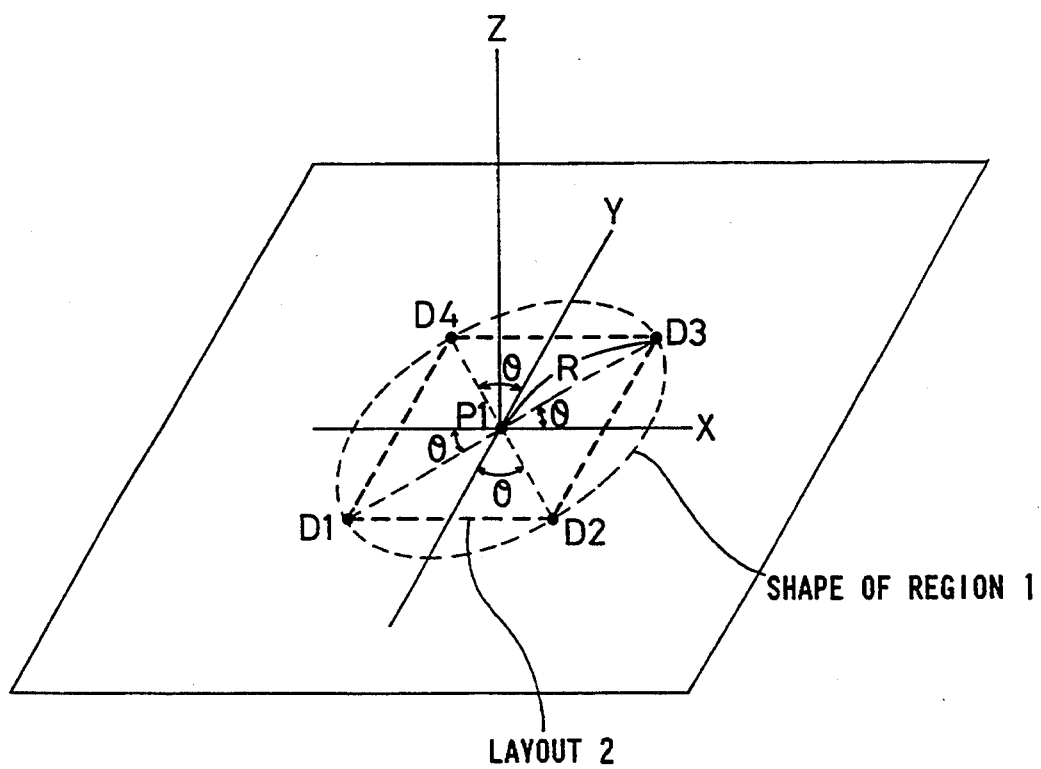
FIG. 12 is a view illustrative of one example in which a plurality of produced virtual target points are shown.

The contents relative to the result of determination 3 represent that a region shape is 1, a layout or arrangement method is 2 and the number of arrangements is 4 (see FIG. 10(c) and FIG. 11). In this case, the region shape 1 represents the configuration of a region of virtual target points, e.g., a circle. The arrangement method 2 represents the layout or arrangement of virtual target points, e.g., a square, and the arrangement number 4 represents that the number of virtual target points is 4.

Since the region shape 1 includes information indicative of a radius of R and information indicative of an angle formed by the X-axis and the Y-axis, coordinate data about virtual target points D1, D2, D3, D4 are produced based on the information or data referred to above (see FIG. 12)(Step S15).

Then, the target point P1 and the virtual target points D1, D2, D3, D4 regarded as objects are all converted into tool-attainable points by using the teaching data generating method according to the first embodiment (Step S16). After all the points have been converted into the tool attainable points, the data generating circuit 47 is activated to calculate corresponding robot's attitude data based on these working point data (Step S17) and store the same (Step S18).

After the target point P1 has been processed in this way, the target points P2, P3, P9, P10 are successively processed in the same manner as described above so as to complete the creation of virtual target-point data.

A description will now be made of a procedure for obtaining desired teaching data in accordance with an on-line teaching process using teaching data comprising the target point P1 serving as the standard and the virtual target points D1, D2, D3, D4 set to the target point P1 with reference to FIG. 13. This description will make clear the meaning of provision of the virtual target points.

Let's now assume that it has been confirmed by an operator that, for example, an error of a distance f1 is developed between a first target point P1 and a point E1 to be welded when a tool center point has been moved to the first target point P1. In order to correct the distance f1, it is necessary for the operator to operate a teaching box and displace the tool center point to the point E1 (see FIG. 13(a)).

In this case, it can be visually determined that the virtual target point D1 is closest to the point E1. Further, the movement of the tool center point to the virtual target point D1 can be immediately carried out because the corresponding robot's attitude data have been computed in advance. It is therefore possible to easily move the tool center point to the point E1 if the tool center point is manually displaced from the virtual target point D1 to the point E1 that the operator desires to weld after the tool center point has been moved to the virtual target point D1. If the amount of displacement of the tool center point from the virtual target point D1 to the point E1 is determined in this way, then the on-line teaching process can be rapidly and easily carried out.

Figure 13B:
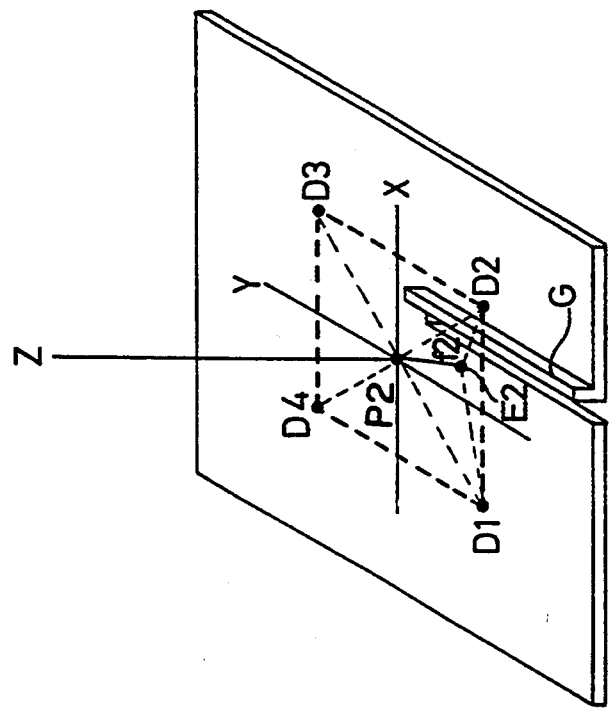
Figure 13A:
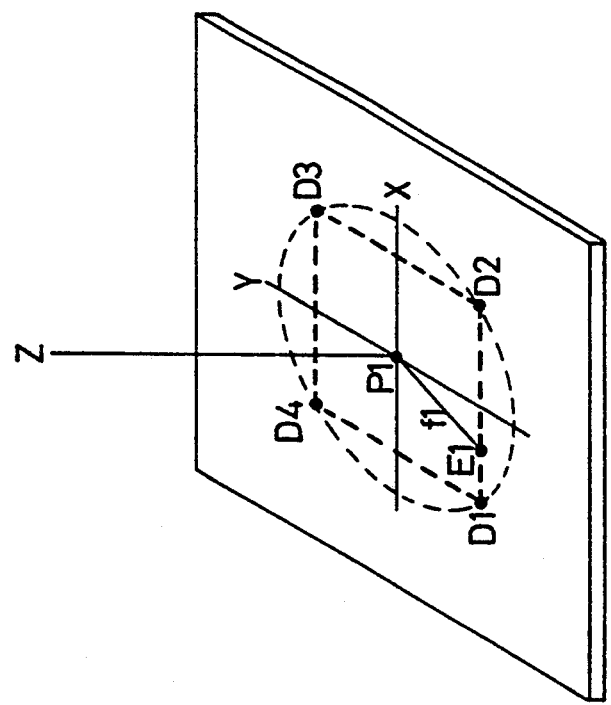

Let's next assume that the operator has confirmed that an error of a distance f2 is developed between a target point P2 and a point E2 that the operator desires to weld as shown in FIG. 13(b) when the tool center point has been moved to the target point P2 included as data in off-line teaching data. In this case, it is determined that the virtual target point D2 is closest to the point E2. However, an obstruction G exists between the virtual target point D2 and the point E2 that the operator desires to weld.

In order to manually displace the tool center point from the virtual target point D2 to the point E2 while avoiding the obstruction G, a plurality of arm shafts should be driven and hence the on-line teaching becomes cumbersome.

Therefore, the tool center point is shifted to the virtual target point D1 near the point E2 after the virtual target point D2. Afterwards, the tool center point is moved from the virtual target point D1 to the point E2. The obstruction does not exist between the virtual target point D1 and the point E2 if the movement of the tool center point is made in this way. It is therefore possible to easily displace the tool center point from the virtual target point D1 to the point E2 by driving a single arm shaft alone.

Having now fully described the invention, it will be apparent to those skilled in the art that many changes and modifications can be made without departing from the spirit or scope of the invention as set forth herein.

What is claimed is:

1. A method of generating teaching data for a robot in an off-line teaching device in which operations of the robot are simulated prior to supplying the teaching data to a robot controller, the method comprising the steps of:

a first step of setting a plurality of trial points in a vicinity of a proposed target point where a tool center point of the robot is desired to be positioned;

a second step of determining by computation, based on work environment data and operating performance data, whether or not said tool center point can be successfully moved to said proposed target point and each of said trial points, said work environment data including data indicative of the shape of at least one of the robot, a peripheral device, a jig and a workpiece and said operating performance data including data indicative of at least one of a number of arms of the robot, lengths of said arms, and acceleration and deceleration performance;

a third step of evaluating a result of said computation with respect to said proposed target point and each of said trial points in accordance with a predetermined evaluation standard and selecting an optimum point from said proposed target point and said trial points, said predetermined evaluation standard including at least one of the following criteria (a) whether a tool can reach said proposed target point or said trial points, (b) whether said tool encounters interference in moving to said proposed target point or said trial points, (c) minimizing an amount of displacement of said tool center point in moving to said proposed target point or said trial points, and (d) maintaining said tool center point in a positive coordinate position relative to said proposed target point; and a fourth step of replacing said proposed target point with said optimum point, wherein said optimum point is thereafter supplied as the teaching data to the robot controller.

2. A method of generating teaching data for a robot in an off-line teaching device in which operations of the robot are simulated prior to supplying the teaching data to a robot controller, the method comprising the steps of:

a first step of setting a plurality of virtual target points in a first vicinity of a proposed target point where a tool center point of the robot is desired to be positioned and combining said proposed target point and said plurality of virtual target points into a spread of target points;

a second step of setting a plurality of trial points in a second vicinity of said spread of target points;

a third step of determining by computation, based on work environment data and operating performance data, whether or not said tool center point can be successfully moved to said spread of target points and each of said trial points, said work environment data including data indicative of the shape of at least one of the robot, a peripheral device, a jig and a workpiece and said operating performance data including data indicative of at least one of a number of arms of the robot, lengths of said arms, and acceleration and deceleration performance;

a fourth step of evaluating a result of said computation with respect to said spread of target points and each of said trial points in accordance with a predetermined evaluation standard and selecting an optimum point from said spread of target points and said trial points, said evaluation standard including at least one of the following criteria (a) whether a tool can reach said spread of target points or said trial points, (b) whether said tool encounters interference in moving to said spread of target points or said trial points, (c) minimizing an amount of displacement of said tool center point in moving to said spread of target points or said trial points, and (d) maintaining said tool center point in a positive coordinate position relative to said spread of target points; and a fifth step of replacing said spread of target points with said optimum point, wherein said optimum point is thereafter supplied as the teaching data to the robot controller.

3. An off-line system for generating teaching data for a robot in which operations of the robot are simulated prior to supplying the teaching data to a robot controller, comprising:

- storing means for storing positional data of a proposed target point where a tool center point of the robot is desired to be positioned, work environment data including shape data of at least one of the robot, a peripheral device, a jig and a workpiece and operating performance data including data indicative of at least one of a number of arms of the robot, lengths of said arms, and acceleration and deceleration performance;
- setting means for setting a plurality of trial points in a vicinity of said proposed target point where said tool center point of the robot is desired to be positioned and storing position data of said trial points together with said proposed target point in said storing means;
- simulating means for determining by computation, based on said work environment data and said operating performance data, whether or not said tool center point of the robot can be successfully moved to said proposed target point and each of said trial points;
- selecting means for evaluating a result of the computation by said simulating means in accordance with a predetermined evaluation standard and selecting an optimum point from said proposed target point and said trial points, said evaluation standard including at least one of the following criteria (a) whether a tool can reach said proposed target point or said trial points, (b) whether said tool encounters interference in moving to said proposed target point or said trial points, (c) minimizing an amount of displacement of said tool center point in moving to said proposed target point or said trial points, and (d) maintaining said tool center point in a positive coordinate position relative to said proposed target point; and
- teaching data generating means for replacing said proposed target point with the optimum point, wherein the optimum point is supplied as the teaching data to the robot controller.

4. An off-line system for generating teaching data for a robot in which operations of the robot are simulated prior to supplying the teaching data to a robot controller, comprising:

- storing means for storing positional data of a proposed target point where a tool center point of the robot is desired to be positioned, work environment data including shape data of at least one of the robot, a peripheral device, a jig and a workpiece and operating performance data including data indicative of at least one of a number of arms of the robot, lengths of said arms, and acceleration and deceleration performance;
- virtual target point setting means for setting a plurality of virtual target points in a first vicinity of said proposed target point and combining said proposed target point and said plurality of virtual target points into a spread of target points;
- setting means for setting a plurality of trial points in a vicinity of said spread of target points and storing positional data of said trial points and said spread of target points in said storing means;
- simulating means for determining by computation, based on said work environment data and said operating performance data, whether or not said tool center point of the robot can be successfully moved to said spread of target points and each of said trial points;
- selecting means for evaluating a result of the computation by said simulating means in accordance with a predetermined evaluation standard and selecting an optimum point from said spread of target points and said trial points, said evaluation standard including at least one of the following criteria (a) whether a tool can reach said spread of target points or said trial points, (b) whether said tool encounters interference in moving to said spread of target points or said trial points, (c) minimizing an amount of displacement of said tool center point in moving to said spread of target points or said trial points, and (d) maintaining said tool center point in a positive coordinate position relative to said spread of target points; and
- teaching data generating means for replacing said spread of target points with the optimum point, wherein the optimum point is supplied as the teaching data to the robot controller.

* * * * *